United States Patent [19]
Dunks et al.

[11] 4,153,672
[45] May 8, 1979

[54] SYNTHESIS OF TETRADECAHYDROUNDECABORATE (−1) FROM BOROHYDRIDE ION

[75] Inventors: Gary B. Dunks, Los Angeles, Calif.; Charles D. Beard, Yorktown Heights, N.Y.

[73] Assignee: Union Carbide Corporation, New York, N.Y.

[21] Appl. No.: 926,757

[22] Filed: Jul. 21, 1978

[51] Int. Cl.$^2$ ............................................. C01B 35/18
[52] U.S. Cl. ............................... 423/287; 260/606.5 B
[58] Field of Search ....................... 423/286, 287, 294; 260/606.5 B

[56] References Cited
U.S. PATENT DOCUMENTS 2,994,718  8/1961  Pearson et al. ................. 260/606.5 B

FOREIGN PATENT DOCUMENTS 899558  6/1962  United Kingdom ..................... 423/287

OTHER PUBLICATIONS

Bell et al.; "Journ. Am. Chem. Soc."; vol. 88, p. 1473, 1966.
Brown et al.; "Jour. Am. Chem. Soc."; vol. 80, p. 1555, 1958.

Primary Examiner—G. O. Peters
Attorney, Agent, or Firm—William Raymond Moran

[57] ABSTRACT

The tetradecahydroundecaborate(−1) anion is synthesized from a metal borohydride by heating a suspension of the borohydride ion in a solvent, such as diglyme, with agitation at a temperature of from 85° C. to about 135° C. and adding an alkyl halide. The $B_{11}H_{14}^-$ anion obtained is useful in the synthesis of decaborane, an intermediate in formation a carborane-based polymers.

10 Claims, No Drawings

SYNTHESIS OF TETRADECAHYDROUNDECABORATE (−1) FROM BOROHYDRIDE ION

This invention relates in general to the synthesis of the tetradecahydroundecaborate(−1) anion. In one aspect, this invention is directed to a novel process for the synthesis of the tetradecahydroundecaborate(−1) anion from borohydride ion using an alkyl halide as the reagent. In a further aspect, this invention is directed to the synthesis of an intermediate useful in the preparation of carborane-based polymers.

The tetradecahydroundecaborate(−1) anion, ($B_{11}H_{14}^-$), was first synthesized by V. D. Aftandilian and coworkers by the reaction of etheral $B_2H_6$ and $NaB_{10}H_{13}$, ("Inorganic Chemistry," Vol. 1, No. 4,734–737 (1962)). $LiB_{11}H_{14}$ was similarly prepared. Both salts were isolated as etherates, $NaB_{11}H_{14}.2.5$ dioxane and $LiB_{11}H_{14}.2$ dioxane. These etherates dissolve readily in water and by metathesis reactions, crystalline nonsolvated cesium, tetramethylammonium, trimethylsulfonium and trimethylammonium salts can be isolated in accordance with the Aftandilian et al. report.

Another synthesis procedure in which a hydride ion source and a boron hydride, e.g. $NaBH_4 + B_2H_6$, are reacted in a solvent medium such as dioxane to form the corresponding $B_{11}H_{14}^-$ salt is reported by H. C. Miller et al. in "Inorganic Chemistry," Vol. 3, No. 10, 1456–1462 (1964). In this reaction the $B_2H_6/NaBH_4$ molar ratio should be kept well below stoichiometric requirements to avoid unduly rapid or violent reactions. The $B_{11}H_{14}^-$ anion had also been prepared from decaborane (14) which in turn had been prepared in mixtures with other boron hydrides in vapor-phase reactions. Those hot-tube reactions were not conveniently carried out in the laboratory nor easily and safety scaled up to commercial-size plant.

Prior to the invention of the present process, the most convenient and practical method for preparing the $B_{11}H_{14}^-$ anion was the reaction of an alkali metal borohydride with boron trifluoride etherate as described in copending application Ser. No. 837,981 U.S. Pat. No. 4,115,520 "Process for the Synthesis of Tetradecahydroundecaborate Compound" filed Sept. 29, 1977 by G. B. Dunks et al. and assigned to the same assignee as the present invention. While an improvement over the earlier procedures disclosed in the prior art, the method utilized corrosive boron trifluoride complexes which are expensive, require careful handling and yield toxic by-products.

The reaction of alkali metal borohydrides with various acids has been used to generate diborane. Among those acids so used are $BCl_3$, $H_3PO_4$, $SnCl_2$, $H_2SO_4$, methanesulfonic acid, polyphosphoric acid, acetic acid and $BF_3.O(C_2H_5)_2$. Iodine and $BF_3.O(C_2H_5)_2$ indeed diborane react with borohydride ion ($BH_4^-$) to produce $B_3H_8^-$ ion. Furthermore, borohydride ion reacts with diborane and higher boranes (e.g. $B_5H_9$ and $B_{10}H_{14}$) to produce $B_{12}H_{12}^{2-}$ and $B_{11}H_{14}^-$ ions. Borohydride ion has been used to convert alkyl halides to the parent alkane, and in fact, alkyl halides were shown to produce diborane from borohydride. With the exception of diborane, however, boron hydrides have not been previously prepared using alkyl halides and borohydrides as reactants.

Thus a new method has now been discovered for synthesizing compounds containing the $B_{11}H_{14}^-$ anion which represents a step in a convenient, safe, non-polluting route to carborane compounds and their polymers via $B_{11}H_{14}^-$ ion and decaborane from commercially available alkali metal borohydrides. Moreover, the alkyl halides employed in the instant invention are much less corrosive, less expensive, and after workup yield benign alkali metal halides, such as sodium chloride, as by-products.

Accordingly, one or more of the following objects will be achieved by the practice of this invention. It is an object of this invention to provide a process for the synthesis of the tetradecahydroundecaborate(−1) anion from borohydride ion using an alkyl halide as the reagent. Another object of this invention is to provide a process which utilizes commercially available materials and avoids the use of corrosive boron trifluoride. A further object is to provide a process which can be conducted under moderate conditions and scaled up for safe and efficient operation. Another object is to provide a process for the preparation of the $B_{11}H_{14}^-$ anion which can employ either liquid or gaseous alkyl halides. A still further object is to provide a process wherein the desired $B_{11}H_{14}^-$ anion is conveniently separated by conventional means. These and other objects will readily become apparent to those skilled in the art in the light of the teachings herein set forth.

In its broad aspect, this invention is directed to a process for the synthesis of the tetradecahydroundecaborate(−1) anion from the borohydride ion using alkyl halides. The process comprises contacting in an inert non-aqueous solvent medium at a temperature of from about 85° to about 135° C.

(a) a tetrahydroborate having the formula:

$$MBH_4$$

wherein M represents an ion selected from the group consisting of sodium, potassium, lithium, cesium, rubidium or lower alkyl-ammonium, with (b) an alkyl halide of the formula:

$$RX$$

wherein R represents an alkyl group of from 1 to about 10 carbon atoms and X represents the chloride, bromide or iodide group.

The process of this invention may be illustrated by the following equation:

$$11\ MBH_4 + 10\ RX \rightarrow MB_{11}H_{14} + 10\ MX + 10\ H_2$$

wherein M represents an alkali metal or tetraalkylammonium moiety, R represents an alkyl group of from 1 to about 10 carbon atoms and X represents the chloride, bromide or iodide group.

Although the preferred borohydride employed in the process of this invention is sodium borohydride, other borohydrides may be used as the starting material. For example, the borohydrides of lithium, cesium, rubidium or the lower alkylammonium borohydrides are useful in the practice of the process.

The alkyl group represented by R in the above equation is preferably a linear alkyl group from 1 to about 10 carbon atoms. Longer, normal alkyl chains can be employed, but they have no advantage. Primary alkyl groups are highly preferred over secondary, cycloalkyl, or tertiary groups because they enter into the reaction faster. Linear alkyls are preferred over branched primary alkyls (e.g. isobutyl) and over cycloalkyls. It has also been observed that monosubstituted alkyl halides react faster than disubstituted ones. A shorter primary alkyl such as amyl ($C_5$) reacts faster than hexyl ($C_6$).

Of the alkyl halides, alkyl bromides are more reactive in producing $B_{11}H_{14}^-$ anion from $BH_4^-$ anion in diglyme at 105° C. than are alkyl chlorides, but for economic reasons, chlorides are preferred. Similarly, the highly expensive alkyl iodides are less desirable for that practical reason.

Although, the stoichiometry of the reaction is shown in the equation above, in practice, an excess of the non-limiting alkyl halide is used. Additionally, agitation of the reaction mixture is desirable during the course of the reaction to provide contact between the slightly soluble alkali metal borohydrides and the alkyl halides. As evidenced by the above reaction the generation of hydrogen gas may be employed as a means of following the course of the reaction.

In practice it has been observed that the temperature range in which to practice the invention is from about 85° to about 135° C. Below about 85° the reaction is incomplete within practical reaction times, while above about 150° C., there is little evidence of the desired complex boron hydride product. The most preferred temperature range for the reaction of an alkali metal borohydride and the alkyl halide is 100°–105° C. A less preferred temperature range is from about 95°–110° C. The solvent for carrying out this invention must meet several criteria. It must dissolve sufficient amounts of the original $BH_4^-$ anion so that the reaction can proceed at a practical rate, it must dissolve sufficient amounts of alkyl halide so that the reaction can occur, and it should be dry because water reacts with borohydrides, thus consuming valuable starting material. Also, the solvent should be unreactive toward $BH_4^-$ ion. If the reaction is to be run at atmospheric pressure, the solvent should boil above about 85° C. so that the rate of reaction is a practical one. Under pressure, a lower boiling solvent could conceivably be used. Additionally, since the most convenient method for removing the solvent after the formation of the $B_{11}H_{14}^-$ anion is by distillation, the solvent should boil below about 200° C. at atmospheric pressure. In fact, a low pressure such as about 15 torr or less is employed to distill off the solvent, so that the reaction mixture need not be heated over 100° C.

Accordingly, it has been observed that the preferred solvent is the dimethyl ether of diethylene glycol, commonly called by its acronym, diglyme, and having a boiling point of 162° C. Other solvents which have the proper boiling point, requisite solubility, and inertness may also be employed. Such solvents include, among others, the diethyl ether of diethylene glycol (diethyl carbitol), and like ethers. As previously indicated, the course of the reaction may be followed by measuring the amount of hydrogen generated. At the preferred temperature range of 100°–105° C., in diglyme using amyl bromide as the alkyl halide, about one-third of the hydrogen is evolved in eight hours, and substantially all in about 10 hours. At reaction times less than four hours, insufficient time has passed for the reaction to take place in the preferred heating range. After 24 hours, there is little advantage to continued heating. Within this range, the preferred reaction time is 8–12 hours.

After the reaction is complete the solvent is preferably removed by vacuum distillation although other methods may be used. Among these are distillation of a low boiling, solvent-water azeotrope at atmospheric pressure. Recovery of the reaction solvent can be accomplished by separation of the solvent from water by "salting out" with a salt such as potassium carbonate, or extraction of the aqueous solvent mixture with a water immisible extractant such as benzene or hexane.

The separation of the desired $B_{11}H_4^-$ anion salt is accomplished by conventional means. As an illustration of one means, the reaction slurry is filtered, employing for example, a medium porosity glass frit. The solids are washed with a low-boiling, inert solvent such as diethyl ether. The washings are combined with the filtrate and the solution of the desired product evaporated at reduced pressure such as about 1–20 torr and at about 40°–80° C. until only a high-boiling oil remains. This oil is then dissolved in about the same volume of water as the original total reaction volume, and tetramethylammonium chloride (about 20 percent stoichiometric excess) is added to precipitate tetramethylammonium tetradecahydroundecaborate($-1$), the desired product. Some other large cation salt may be used. After about 15 minutes of digestion, the solid product is filtered from the aqueous solution and recrystallized from an acetone-water mixture or other suitable solvent system. This is the preferred procedure for working up the product. Appropriate variations will be apparent to those skilled in the technique of chemicals separation.

As previously indicated the $B_{11}H_{14}^-$ anion is useful in the synthesis of decaborane (14). Decaborane (14) itself is an intermediate for synthesizing carboranes which are useful in the preparation of polymers.

The following examples are illustrative:

EXAMPLE I

Use of a Liquid Alkyl Halide

To a 500 ml. 4-neck flask fitted with a mechanical stirrer, a thermometer to which a temperature regulating device was attached, a dropping funnel and an exit tube which required gases produced to pass through a scrubber prior to venting, was added 100 ml of dry diglyme and 6.0 g (0.159 mol) of sodium borohydride. The mixture was heated to 105° C. and from the dropping funnel 128 ml (0.693 mol) of neat n-amyl bromide was added over approximately five hours. The course of the reaction was followed by observing the rate and amount of hydrogen produced. When the evolution of gas diminished, the reaction was considered complete. The slurry was cooled to ambient temperature and filtered using a medium porosity glass frit. An aliquot (about 0.5 ml) of this filtrate was analyzed by $^{11}B$ nmr on a Brucker SX-90 spectrometer operating at 28.8 MHz in conjunction with a 90 MHz proton decoupler. The solids were washed with ethyl ether and the washings combined with the filtrate. The combined filtrate was stripped to an oil using a rotary evaporator and a mechanical pump. The oil was dissolved in 200 ml of water and 12 g of tetramethylammonium chloride added, yielding the tetramethylammonium salt of the $B_{11}H_{14}^-$ anion. The mixture was allowed to stand fifteen minutes and filtered. The crude product was recrystallized from acetone-water to yield 2.0 g [0.0097 mol (not normalized as in Table I) 67.1%] of pure $(CH_3)_4NB_{11}H_{14}$.

EXAMPLE 2

Use of a Gaseous Alkyl Halide

In a 500 ml flask (fitted as in example 1 above) was placed 100 ml of dry diglyme and 6.0 g (0.159 mol) of sodium borohydride. The mixture was heated to 105° and a slow stream of methyl chloride was allowed to pass through a tube which extended below the surface of the reaction mixture for approximately four hours (29.7 g, 0.58 mol of CH$_3$Cl were added). The course of the reaction was followed by observing the rate and amount of hydrogen produced. When the evolution of gas diminished, the reaction was considered complete. The mixture was cooled and filtered. An aliquot (about 0.5 ml) of this filtrate was analyzed by $^{11}$B nmr on a Brucker SX-90 spectrometer operating at 28.8 MHz in conjunction with a 90 MHz proton decoupler. The filtrate was stripped using a rotary evaporator and a mechanical pump. The resulting oil was dissolved in 200 ml of water and added to a solution containing 12 g tetramethylammonium chloride to precipitate the tetramethylammonium salt of B$_{11}$H$_{14}^-$ anion. The mixture was filtered and the crude product was crystallized from acetone-water to yield 1.6 g [0.0077 mol (not normalized) 54%] of pure (CH$_3$)$_4$NB$_{11}$H$_{14}$.

EXAMPLES 3–6

In a manner similar to that employed in Example 1 above, other alkyl halides were used in place of n-amyl bromide. The alkyl halide used in the reaction and yields of the B$_{11}$H$_{14}^-$ anion are set forth in Table I below:

TABLE I

| Ex. | Alkyl Halide (RX) | Moles RX Per Mole NaBH$_4$ | Moles B$_{11}$H$_{14}$-Formed | % Yield | NaX Moles |
|---|---|---|---|---|---|
| 3 | n-butyl chloride | 0.91 | 0.023 | 25 | 0.97 |
| 4 | n-hexyl bromide | 0.91 | 0.016 | 18 | 0.89 |
| 5 | methylene chloride | 0.998 | 0.024 | 26 | — |
| 6 | n-amyl bromide | 0.9 | 0.052 (by nmr) | 57 | — |

Although the invention has been illustrated by the preceding examples, it is not to be construed as being limited to the materials employed herein, but rather, the invention encompasses the generic area as hereinbefore disclosed. Various modifications and embodiments can be made without departing from the spirit and scope thereof.

What is claimed is:

1. A process for the preparation of a tetradecahydroundecaborate($-1$) ion which comprises contacting in an inert, non-aqueous solvent medium and at a temperature of from about 85° to about 135° C., (a) a tetrahydroborate having the formula:

MBH$_4$ wherein M represents an ion selected from the group consisting of sodium, potassium, lithium, cesium, rubidium or lower alkyl ammonium, with (b) an alkyl halide of the formula:

RX wherein R represents an alkyl group of from 1 to about 10 carbon atoms and X represents the chloride, bromide or iodide group.

2. The process of claim 1 wherein said inert, non-aqueous solvent is an ether.

3. The process of claim 2 wherein said ether is the dimethyl ether of diethylene glycol.

4. The process of claim 1 wherein said tetrahydroborate is sodium borohydride.

5. The process of claim 1 wherein said alkyl halide is n-amyl bromide.

6. The process of claim 1 wherein said alkyl halide is methyl chloride.

7. The process of claim 1 wherein said alkyl halide is n-butyl chloride.

8. The process of claim 1 wherein said alkyl halide is n-hexyl chloride.

9. The process of claim 1 wherein said tetrahydroborate and said alkyl halide are allowed to react for from about 4 to about 12 hours.

10. The process of claim 1 wherein said alkyl halide is gradually added to an agitated suspension of said tetrahydroborate in said solvent.

* * * * *